US012726686B2

(12) United States Patent
Ishida et al.

(10) Patent No.: US 12,726,686 B2
(45) Date of Patent: Sep. 1, 2026

(54) INFORMATION PROCESSING SYSTEM, INFORMATION PROCESSING DEVICE, INFORMATION PROCESSING METHOD, AND INFORMATION PROCESSING PROGRAM

(71) Applicant: KPI SOLUTIONS CO., LTD., Tokyo (JP)

(72) Inventors: Tetsuro Ishida, Tokyo (JP); Noboru Someya, Tokyo (JP); Atsushi Oasa, Tokyo (JP)

(73) Assignee: KPI Solutions Co., Ltd., Tokyo (JP)

(*) Notice: Subject to any disclaimer, the term of this patent is extended or adjusted under 35 U.S.C. 154(b) by 356 days.

(21) Appl. No.: 18/702,722

(22) PCT Filed: Oct. 18, 2021

(86) PCT No.: PCT/JP2021/038482
§ 371 (c)(1),
(2) Date: Apr. 18, 2025

(87) PCT Pub. No.: WO2023/067661
PCT Pub. Date: Apr. 27, 2023

(65) Prior Publication Data

US 2026/0059181 A1 Feb. 26, 2026

(51) Int. Cl.
*H04N 21/854* (2011.01)
*H04L 9/00* (2022.01)
(Continued)

(52) U.S. Cl.
CPC ............. *H04N 21/854* (2013.01); *H04L 9/50* (2022.05); *H04N 21/4627* (2013.01); *H04N 21/8113* (2013.01); *H04N 21/816* (2013.01)

(58) Field of Classification Search
CPC ........... H04N 21/2541; H04N 21/8358; H04N 21/4627; H04N 21/44236
See application file for complete search history.

(56) References Cited

U.S. PATENT DOCUMENTS

2002/0083324 A1 6/2002 Hirai
2019/0251648 A1* 8/2019 Liu ......................... G06F 16/27
(Continued)

FOREIGN PATENT DOCUMENTS

JP 2002-057882 A 2/2002
JP 2003-295747 A 10/2003
(Continued)

OTHER PUBLICATIONS

Oct. 18, 2022—Office Action, JP 2021-575450, 11 pages.
(Continued)

*Primary Examiner* — Jason Salce
(74) *Attorney, Agent, or Firm* — Polsinelli PC

(57) ABSTRACT

An information processing device generates a third content by combining a first content and a second content, and generates third identification information indicating identification information of the third content on the basis of first identification information indicating identification information of the first content and second identification information indicating identification information of the second content. The information processing device stores use history information indicating a use history of the third content and the third identification information in a storage unit in association with each other, and updates the use history information depending on the use history of the third content.

9 Claims, 10 Drawing Sheets

(51) Int. Cl.

| | |
|---|---|
| ***H04N 21/4627*** | (2011.01) |
| ***H04N 21/81*** | (2011.01) |

(56) References Cited

U.S. PATENT DOCUMENTS

| | | | | |
|---|---|---|---|---|
| 2021/0281569 | A1 | 9/2021 | Soon-Shiong | |
| 2022/0058241 | A1* | 2/2022 | Ekberg | G06F 21/1078 |
| 2022/0167066 | A1* | 5/2022 | Yu | H04N 21/835 |
| 2022/0312059 | A1* | 9/2022 | Laul | H04N 21/2541 |
| 2023/0031846 | A1* | 2/2023 | Yang | G10L 25/18 |
| 2023/0353828 | A1* | 11/2023 | Wang | G06V 10/774 |
| 2025/0113073 | A1* | 4/2025 | Ha | G06Q 30/0601 |

FOREIGN PATENT DOCUMENTS

| | | | |
|---|---|---|---|
| JP | 2008-165625 | A | 7/2008 |
| JP | 2017-118447 | A | 6/2017 |
| JP | 2021-015580 | A | 2/2021 |
| JP | 2021-071903 | A | 5/2021 |
| KR | 10-2021-0030127 | A | 3/2021 |

OTHER PUBLICATIONS

Mar. 22, 2022—Office Action, JP 2021-575450, 8 pages.

Dec. 28, 2021—International Search Report, PCT/JP2021/038482, 2 pages.

* cited by examiner 10
12
SERVER
15
FIRST TERMINAL
14A
SECOND TERMINAL
14B
BROWSING TERMINAL
14C
14
BLOCKCHAIN NODE
16A
BLOCKCHAIN NODE
16B
BLOCKCHAIN NODE
16C
16

FIG.4

| COMBINED CONTENT ID | COMBINED CONTENT | USE HISTORY INFORMATION | SHARE RATIO INFORMATION OF COPYRIGHT | FIRST CONTENT | FIRST CONTENT ID | FIRST USER ID | SECOND CONTENT | SECOND CONTENT ID | SECOND USER ID |
|---|---|---|---|---|---|---|---|---|---|
| ID_$C_{AB}$ | $C_{AB}$ | XXX | YYY | $C_A$ | ID_$C_A$ | ID_A | $C_B$ | ID_$C_B$ | ID_B |
| … | … | … | … | … | … | … | … | … | … |
| … | … | … | … | … | … | … | … | … | … |

FIG.5

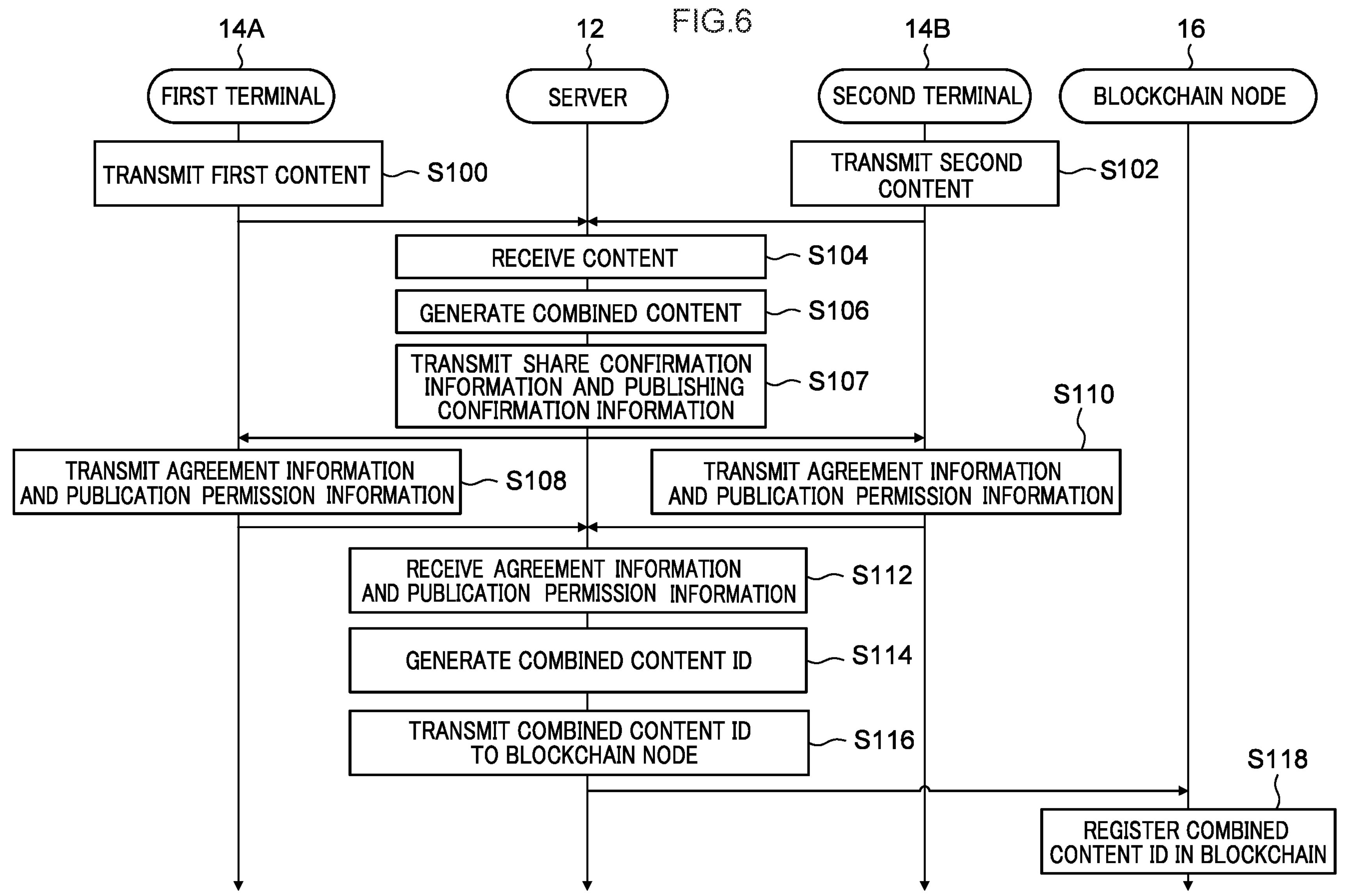
FIG.6
14A
FIRST TERMINAL
12
SERVER
14B
SECOND TERMINAL
16
BLOCKCHAIN NODE
TRANSMIT FIRST CONTENT
S100
TRANSMIT SECOND CONTENT
S102
RECEIVE CONTENT
S104
GENERATE COMBINED CONTENT
S106
TRANSMIT SHARE CONFIRMATION INFORMATION AND PUBLISHING CONFIRMATION INFORMATION
S107
S110
TRANSMIT AGREEMENT INFORMATION AND PUBLICATION PERMISSION INFORMATION
S108
TRANSMIT AGREEMENT INFORMATION AND PUBLICATION PERMISSION INFORMATION
RECEIVE AGREEMENT INFORMATION AND PUBLICATION PERMISSION INFORMATION
S112
GENERATE COMBINED CONTENT ID
S114
TRANSMIT COMBINED CONTENT ID TO BLOCKCHAIN NODE
S116
S118
REGISTER COMBINED CONTENT ID IN BLOCKCHAIN

Figure 7:
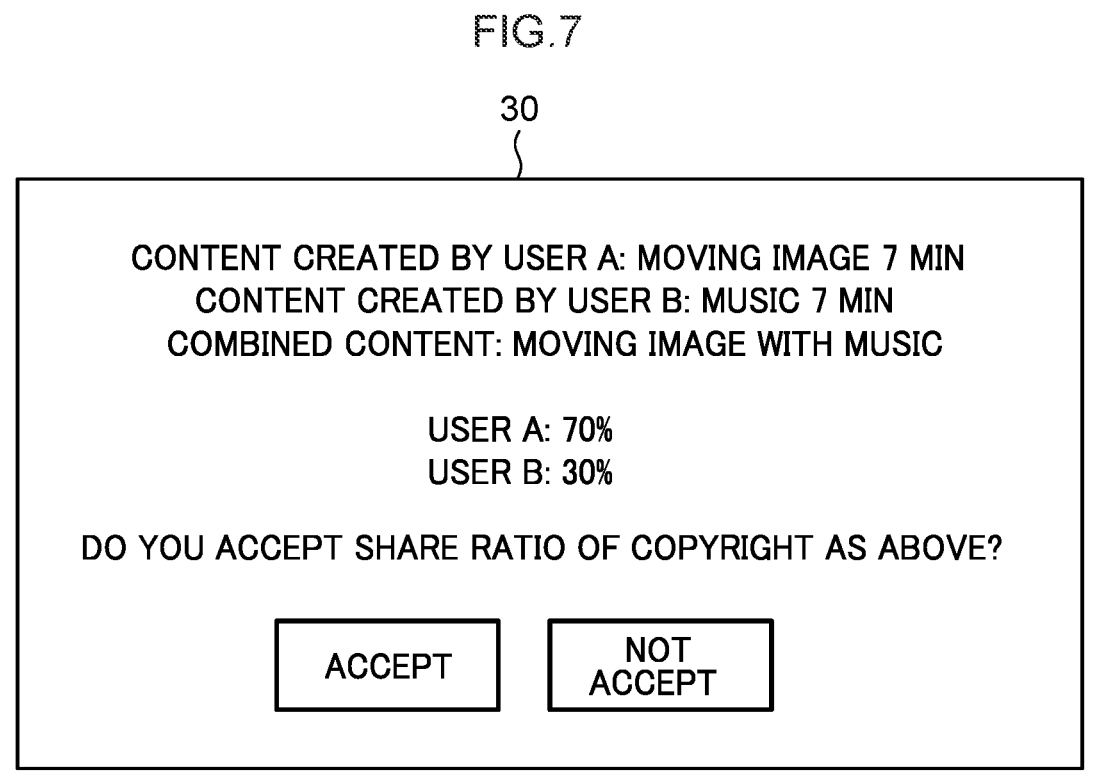

CONTENT CREATED BY USER A: MOVING IMAGE 7 MIN
CONTENT CREATED BY USER B: MUSIC 7 MIN
COMBINED CONTENT: MOVING IMAGE WITH MUSIC

USER A: 70%
USER B: 30%

DO YOU ACCEPT SHARE RATIO OF COPYRIGHT AS ABOVE?

ACCEPT

NOT ACCEPT

Figure 8:
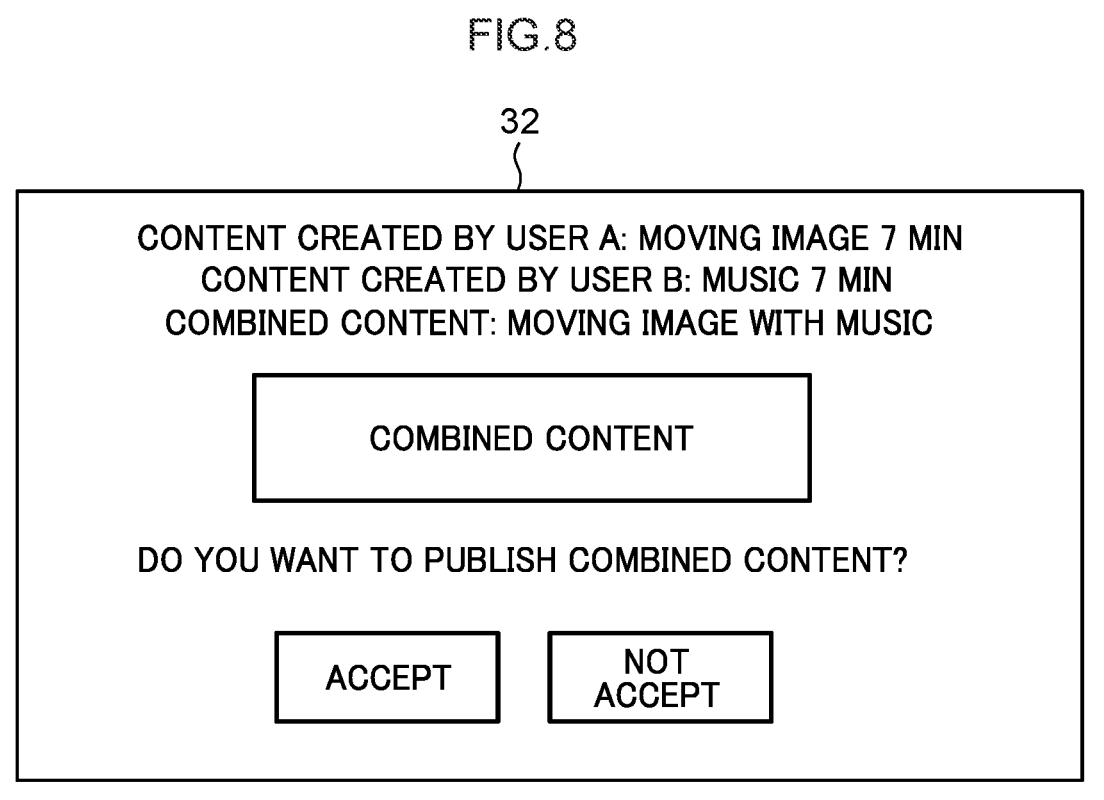

CONTENT CREATED BY USER A: MOVING IMAGE 7 MIN
CONTENT CREATED BY USER B: MUSIC 7 MIN
COMBINED CONTENT: MOVING IMAGE WITH MUSIC

COMBINED CONTENT

DO YOU WANT TO PUBLISH COMBINED CONTENT?

ACCEPT

NOT ACCEPT

14C
BROWSING TERMINAL
12
SERVER
16
BLOCKCHAIN NODE
S200
TRANSMIT REQUEST SIGNAL FOR REPRODUCTION OF COMBINED CONTENT
S202
RECEIVE REQUEST SIGNAL
S204
REPRODUCE COMBINED CONTENT
S206
RECEIVE REPRODUCTION DATA OF COMBINED CONTENT
S208
UPDATE USE HISTORY INFORMATION
S210
STORE HASH VALUE OF USE HISTORY INFORMATION IN BLOCKCHAIN

INFORMATION PROCESSING SYSTEM, INFORMATION PROCESSING DEVICE, INFORMATION PROCESSING METHOD, AND INFORMATION PROCESSING PROGRAM

CROSS-REFERENCE TO RELATED APPLICATIONS

The present application is a U.S. National Stage application of the Patent Cooperation Treaty (PCT) Application No. PCT/JP2023/067661, filed Oct. 18, 2021.

TECHNICAL FIELD

The present disclosure relates to an information processing system, an information processing device, an information processing method, and an information processing program.

BACKGROUND ART

Japanese Patent Application Laid-Open (JP-A) No. 2021-071903 discloses a copyright management system. The copyright management system specifies a work which is performed or performed. Specifically, the copyright management system specifies music by comparing (a certificate including) a feature amount managed in a blockchain ledger with a feature amount extracted from voice data (see, for example, [Abstract] of JP-A No. 2021-071903).

JP-A No. 2021-015580 discloses a system capable of calculating a total usage fee of copyrights of materials used for synthesis and billing the total usage fee to a user in a case of synthesizing an image or a video.

Specifically, in this system, a material associated with a usage fee (hereinafter referred to as a "material with a usage fee") transmitted from an information terminal related to a person (hereinafter referred to as a "service provider") who provides a service for creating a composite image or the like (hereinafter referred to as a "composite image or the like creation service") is stored in a storage device. In a case in which there is an access from an information terminal related to a user of the composite image or the like creation service (hereinafter referred to as "service user"), the system displays the material with a usage fee stored in the storage device and allows selecting it. Thereafter, the system synthesizes the selected material with a usage fee with an image or a video captured or stored by the information terminal of the service user (hereinafter referred to as an "original image") on the information terminal of the service user to create or display a prototype composite image or the like (hereinafter referred to as a "prototype image or the like"), and in a case in which the system receives approval information from the information terminal of the service user, the system stores or downloads the prototype image or the like that has been prototyped and displayed, and at the same time, the system calculates a usage fee of a copyright related to the material used for the prototype image or the like related to the approval information and charges the service user (see, for example, claim 1 of JP-A No. 2021-015580).

JP-A No. 2017-118447 discloses a copyright protection device that protects copyright in consideration of both editing between contents and editing in the contents. The copyright protection device controls editing of content including a plurality of pieces of partial content by an electronic signature.

SUMMARY OF INVENTION

Technical Problem

Meanwhile, in a case in which content such as a video is created, there is a case in which content is created by participation of a plurality of users. For example, one content $C_{AB}$ may be generated by combining a content $C_A$ of music created by a certain user A and a content $C_B$ of a moving image created by another user B.

In this case, the copyright occurs in the content $C_A$ created by the user A, and the copyright also occurs in the content $C_B$ created by the user B. The copyright also occurs in the content $C_{AB}$ in which the content $C_A$ and the content $C_B$ are combined. Since the content $C_{AB}$ is a joint work or a combined work by the user A and the user B, it is necessary to pay a copyright usage fee to the user A and the user B who are copyright holders depending on the use of the content $C_{AB}$.

Each of the documents discloses a technique for managing a copyright, but does not disclose copyright management of content created by a plurality of users.

For example, the technique disclosed in JP-A No. 2021-015580 relates to a composite image or the like creation service, and is a technique for calculating a usage fee for a copyright when a service user selects a material with a usage fee to create a composite image or the like, and billing the service user for the copyright. The technology of JP-A No. 2017-118447 is a technology of controlling editing of content including a plurality of partial contents by an electronic signature.

Thus, there is a problem that it is not possible to manage the copyright of the content created by a plurality of users even if the technology disclosed in each of the above documents is used.

Conventionally, the location of the copyright of works created by an artist or the like such as a musician, a painter, a calligrapher, a photographer, an animator, an actor, a voice actor, a writer, a playwright, a dancer, or a choreographer is not clear in many cases. Even if the location of the copyright of those works is clear, a publisher or a promoter often has the copyright, and in that case, there are restrictions such as prohibition of free creation or selling by the artist, and there are many cases where the artist is exploited.

Here, there are few systems by which an artist individually publishes his/her works on the Internet, leading to revenue, and there are many cases where works are illegally copied and used. A system for automatically managing these copyrights and managing works is required.

The disclosure has been made in view of the above circumstances, and an object thereof is to provide an information processing system, an information processing device, an information processing method, and an information processing program capable of managing use of content created by a plurality of users.

Solution to Problem

In order to achieve the above object, an information processing system according to the present disclosure is an information processing system including a first terminal operated by a first user, a second terminal operated by a second user, and an information processing device, in which the first terminal transmits a first content created by the first user and first identification information indicating identification information of the first content to the information processing device, the second terminal transmits a second content created by the second user and second identification information indicating identification information of the second content to the information processing device, and the information processing device generates a third content by combining the first content and the second content, generates third identification information indicating identification information of the third content on the basis of the first identification information and the second identification information, stores use history information indicating a use history of the third content and the third identification information in a storage unit in association with each other, and updates the use history information depending on the use history of the third content.

An information processing device according to the invention is an information processing device in an information processing system including a first terminal operated by a first user, a second terminal operated by a second user, and the information processing device, in which the first terminal transmits a first content created by the first user and first identification information indicating identification information of the first content to the information processing device, the second terminal transmits a second content created by the second user and second identification information indicating identification information of the second content to the information processing device, and the information processing device generates a third content by combining the first content and the second content, generates third identification information indicating identification information of the third content on the basis of the first identification information and the second identification information, stores use history information indicating a use history of the third content and the third identification information in a storage unit in association with each other, and updates the use history information depending on the use history of the third content.

An information processing method according to the invention is an information processing method executed by an information processing device in an information processing system including a first terminal operated by a first user, a second terminal operated by a second user, and the information processing device, the method including, by a computer included in the information processing device, executing processing in which the first terminal transmits a first content created by the first user and first identification information indicating identification information of the first content to the information processing device, the second terminal transmits a second content created by the second user and second identification information indicating identification information of the second content to the information processing device, and the information processing device generates a third content by combining the first content and the second content, generates third identification information indicating identification information of the third content on the basis of the first identification information and the second identification information, stores use history information indicating a use history of the third content and the third identification information in a storage unit in association with each other, and updates the use history information depending on the use history of the third content.

An information processing program according to the invention is an information processing program to be executed by a computer included in an information processing device in an information processing system including a first terminal operated by a first user, a second terminal operated by a second user, and the information processing device, the program causing the computer included in the information processing device to execute processing in which the first terminal transmits a first content created by the first user and first identification information indicating identification information of the first content to the information processing device, the second terminal transmits a second content created by the second user and second identification information indicating identification information of the second content to the information processing device, and the information processing device generates a third content by combining the first content and the second content, generates third identification information indicating identification information of the third content on the basis of the first identification information and the second identification information, stores use history information indicating a use history of the third content and the third identification information in a storage unit in association with each other, and updates the use history information depending on the use history of the third content.

Advantageous Effects of Invention

According to the disclosure, it is possible to obtain an effect of managing use of content created by a plurality of users.

BRIEF DESCRIPTION OF DRAWINGS

FIG. 4 is a diagram illustrating an example of data stored in a data storage unit of the embodiment.

FIG. 5 is a schematic block diagram of a computer that functions as each device of the information processing system.

FIG. 6 is an explanatory diagram for describing processing executed by the information processing system of the embodiment.

FIG. 7 is a diagram illustrating an example of share confirmation information displayed on a terminal.

FIG. 8 is a diagram illustrating an example of publishing confirmation information displayed on the terminal.

DESCRIPTION OF EMBODIMENTS

Hereinafter, an embodiment will be described in detail with reference to the drawings.

<System Configuration of Information Processing System>

Figure 1:
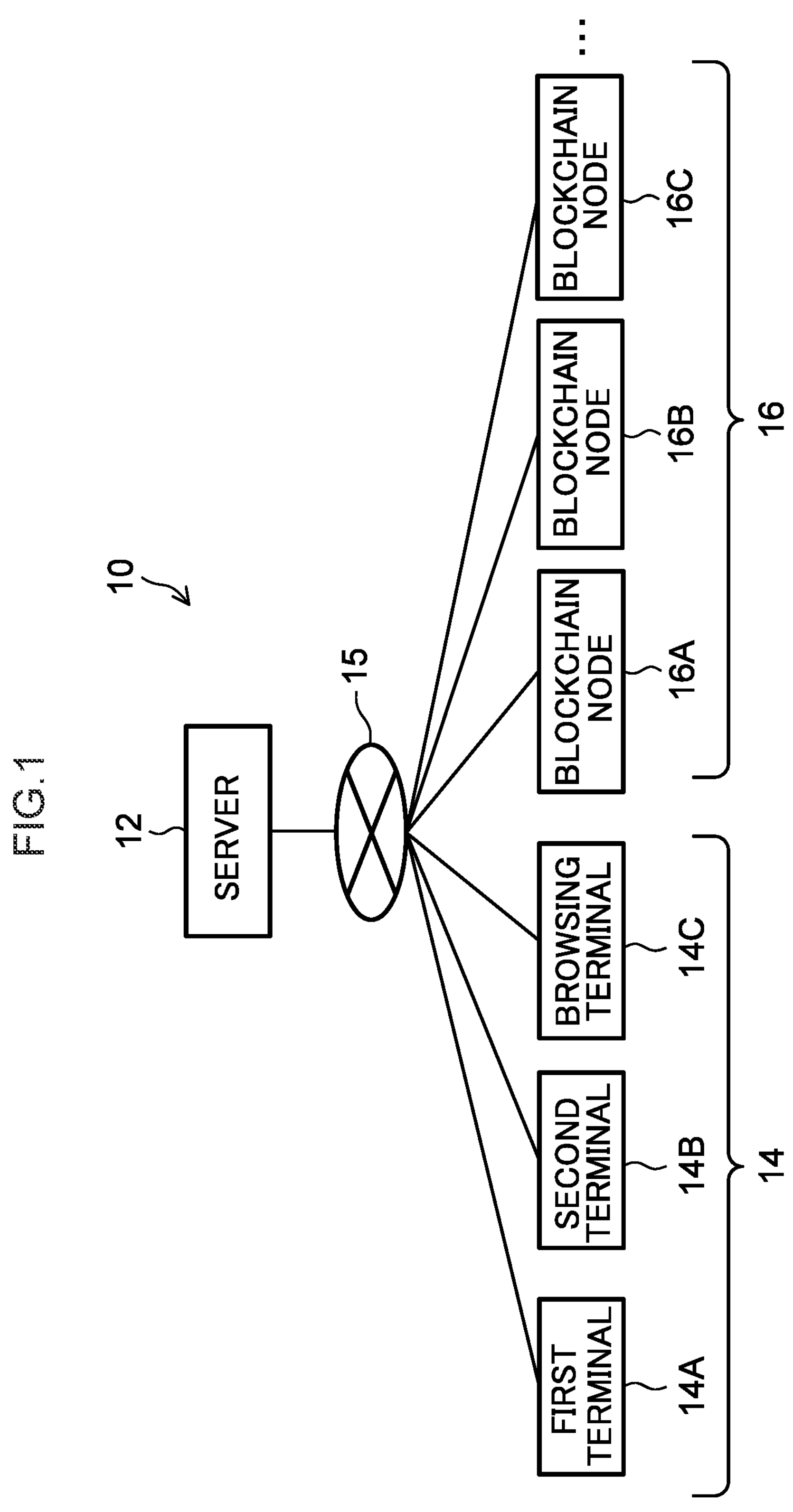
FIG. 1 is a diagram illustrating an example of a schematic configuration of an information processing system of the present embodiment.

FIG. 1 is a block diagram illustrating an information processing system 10 according to an embodiment. As illustrated in FIG. 1, an information processing system 10 according to an embodiment includes a server 12, a first terminal 14A operated by a first user, a second terminal 14B operated by a second user, a browsing terminal 14C, and a plurality of blockchain nodes 16A, 16B, and 16C. The server 12, the first terminal 14A, the second terminal 14B, the browsing terminal 14C, and the plurality of blockchain nodes 16A, 16B, and 16C are connected by a network 15 such as the Internet, for example. Hereinafter, in a case in which the first terminal 14A, the second terminal 14B, and the browsing terminal 14C are collectively referred to, they are also simply referred to as the terminal 14. The terminal 14 is, for example, a smartphone or a personal computer. In a case in which the blockchain nodes 16A, 16B, and 16C are collectively referred to, they are also simply referred to as blockchain nodes 16.

The server 12 of the information processing system 10 according to the embodiment generates combined content that is an example of a third content by combining a first content transmitted from the first terminal 14A and a second content transmitted from the second terminal 14B. In the following description, a user who operates the first terminal 14A is referred to as a first user, and a user who operates the second terminal 14B is referred to as a second user. The server 12 manages the copyright with respect to downloading, browsing, reproducing, and the like of the combined content.

Figure 2:
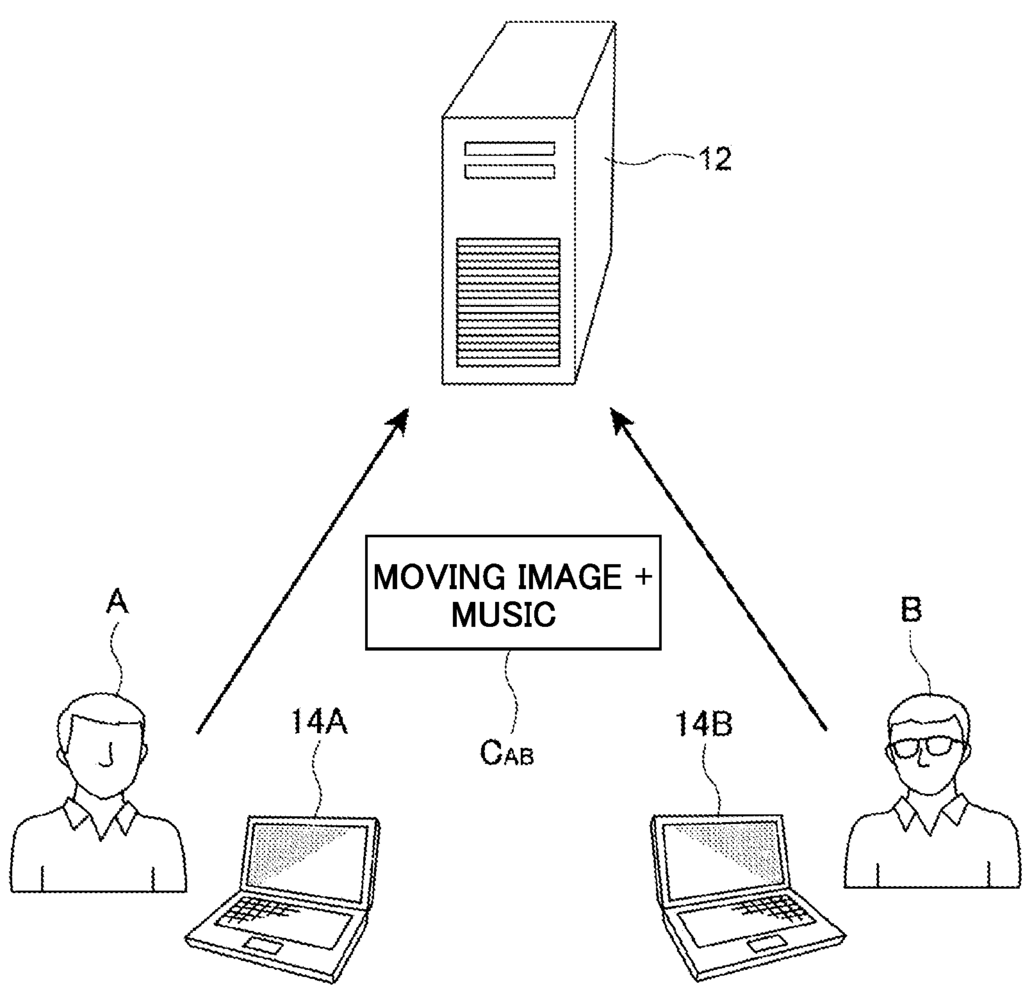
FIG. 2 is a diagram for describing an outline of the embodiment.

FIG. 2 is a diagram for describing an outline of the present embodiment. As illustrated in FIG. 2, it is considered a case in which a first user A who operates the first terminal 14A creates a content of a moving image, and a second user B who operates the second terminal 14B creates a content of music. In this case, the server 12 of the embodiment generates a combined content $C_{AB}$ which is a moving image content with music by combining the contents. The server 12 manages the copyright of the combined content $C_{AB}$. Specifically, every time the combined content $C_{AB}$ is downloaded, browsed, reproduced, or the like, a usage fee of the copyright of the combined content $C_{AB}$ is calculated, and the usage fee is managed so as to be paid to the first user A and the second user B. The information processing system 10 of the embodiment regards the generation of the combined content $C_{AB}$ as one transaction, and registers a combined content ID indicating the ID of the combined content $C_{AB}$ generated at that time in the blockchain included in the blockchain node 16. The blockchain is an example of a storage unit configured by a distributed ledger technology. In the embodiment, a case in which a blockchain is used as an example of a storage unit configured by a distributed ledger technology will be described as an example, but the invention is not limited thereto. For example, a storage unit using another type of distributed ledger technology may be used, or a storage unit not configured by the distributed ledger technology may be used. The combined content ID registered in the blockchain is information unique to the combined content, and can also be used as a non-fungible token (NFT). The combined content ID is an example of third identification information and a third content ID.

Hereinafter, a specific description will be given.

Figure 3:
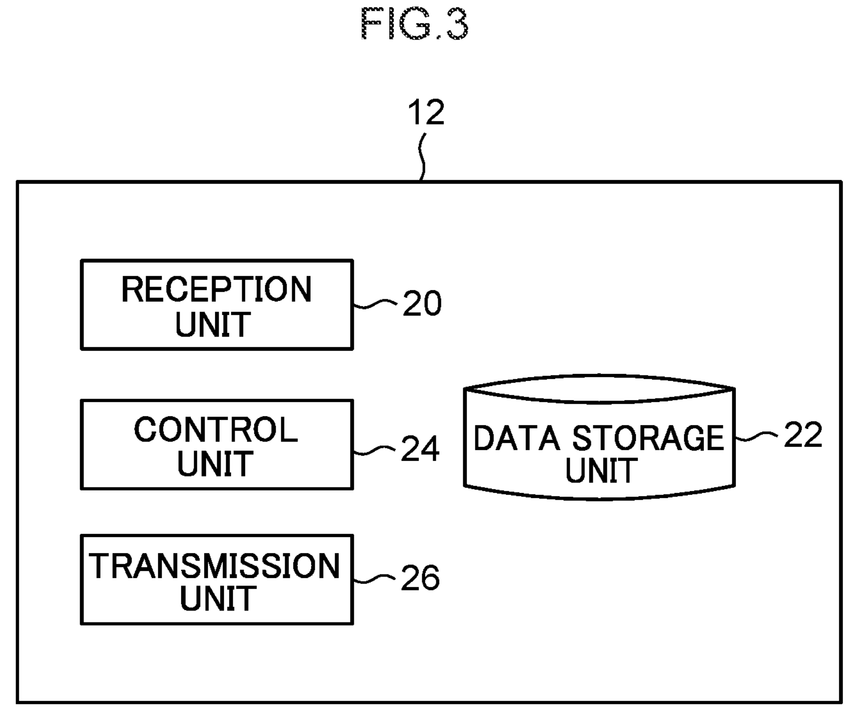
FIG. 3 is a diagram illustrating a functional configuration example of a server of the embodiment.

FIG. 3 is a diagram illustrating a functional configuration of the server 12 according to the embodiment. As illustrated in FIG. 3, the server 12 includes a reception unit 20, a data storage unit 22, a control unit 24, and a transmission unit 26.

The reception unit 20 receives various data transmitted from the terminal 14 or the blockchain node 16.

The data storage unit 22 stores various data received by the reception unit 20 and various data generated by the server 12. FIG. 4 illustrates an example of information stored in the data storage unit 22. As illustrated in FIG. 4, the combined content ID, the combined content, use history information, share ratio information of copyright, the first content, a first content ID, a first user ID, the second content, a second content ID, and a second user ID are stored in the data storage unit 22 in, for example, a table format in association with each other. Details of these data will be described later.

The control unit 24 controls the operation of the server 12.

The transmission unit 26 transmits various data to the terminal 14.

Figure 5:
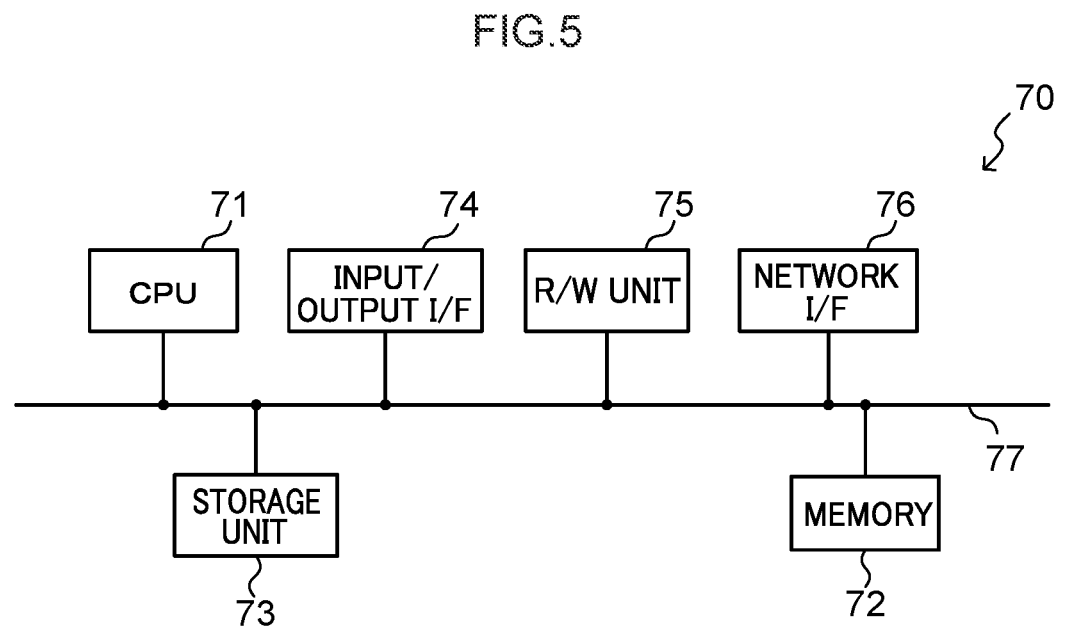

The server 12, the terminal 14, and the blockchain node 16 of the information processing system 10 can be implemented by, for example, a computer 70 illustrated in FIG. 5. The computer 70 includes a CPU 71, a memory 72 as a temporary storage area, and a nonvolatile storage unit 73. The computer 70 includes an input/output interface (I/F) 74 to which an input/output device or the like (not illustrated) is connected, and a read/write (R/W) unit 75 that controls reading and writing of data with respect to a recording medium. The computer 70 includes a network I/F 76 connected to a network such as the Internet. The CPU 71, the memory 72, the storage unit 73, the input/output I/F 74, the R/W unit 75, and the network I/F 76 are connected to each other via a bus 77.

The storage unit 73 can be achieved by a hard disk drive (HDD), a solid state drive (SSD), a flash memory, or the like. The storage unit 73 as a storage medium stores a program for causing the computer 70 to function. The CPU 71 reads the program from the storage unit 73, develops the program in the memory 72, and sequentially executes processes included in the program.

<Operation of Information Processing System 10>

Next, operation of the information processing system 10 according to the embodiment will be described. In the following, a case in which the first user who operates the first terminal 14A creates the first content, the second user who operates the second terminal 14B creates the second content, and the server 12 generates the combined content which is an example of the third content by combining the first content and the second content will be described as an example. The information processing system 10 executes the sequence illustrated in FIG. 6.

First, the first user creates the first content by operating the first terminal 14A. The second user creates the second content by operating the second terminal 14B.

In step S100, the first terminal 14A transmits the first content, the first content ID indicating the ID of the first content, and the first user ID indicating the ID of the first user to the server 12. At least one of the first content ID or the first user ID is an example of first identification information indicating identification information of the first content.

In step S102, the second terminal 14B transmits the second content, the second content ID indicating the ID of the second content, and the second user ID indicating the ID of the second user to the server 12. At least one of the second content ID or the second user ID is an example of second identification information indicating identification information of the second content.

In step S104, the reception unit 20 of the server 12 receives the first content and the second content. The reception unit 20 of the server 12 receives the first content ID, the first user ID, the second content ID, and the second user ID.

In step S106, the control unit 24 of the server 12 generates the combined content by combining the first content and the second content. Specifically, the control unit 24 generates the combined content by a known mashup method which is an example of a method for generating the combined content. For example, in a case in which the first content is a moving image and the second content is music, the control unit 24 generates a content of a moving image with music obtained by combining the first content and the second content as combined content by using a known mashup method. Any method may be used as a method of generating the combined content.

In step S107, the control unit 24 of the server 12 controls the transmission unit 26 to transmit share confirmation information for confirming a share ratio of copyright of the combined content generated in step S106 and publishing confirmation information of the combined content to the first terminal 14A and the second terminal 14B.

In step S108, the share confirmation information for confirming the share ratio of the copyright of the combined content is displayed on a display unit (not illustrated) of the first terminal 14A.

In step S110, the display unit (not illustrated) of the second terminal 14B displays the share confirmation information on the share ratio of the copyright of the combined content.

FIG. 7 illustrates an example of the share confirmation information. In share confirmation information 30 of FIG. 7, the share ratio of the copyright for the first user A and the second user B is confirmed for the share ratio of the combined content. Specifically, in the example of FIG. 7, a share ratio of 7:3 is proposed between the first user A and the second user B.

The control unit 24 of the server 12 may generate the share confirmation information on the basis of the first content and the second content. For example, the control unit 24 sets the ratio between the data amount of the first content and the data amount of the second content as the share ratio. Alternatively, for example, the control unit 24 proposes the share ratio according to the data type of the first content and the data type of the second content. For example, in a case in which the first content is a moving image and the second content is music, the control unit 24 sets the share ratio between the first user A and the second user B to 7:3.

The first user A and the second user B browse the share confirmation information 30, correct the share ratio as appropriate, and press "accept" of the share confirmation information.

At the same time as the share confirmation information regarding the share ratio, publishing confirmation information 32 illustrated in FIG. 8 is also presented to each user. An actual combined content is displayed at a position of "combined content" in the publishing confirmation information 32 of FIG. 8, and each user is confirmed whether or not the combined content may be published.

When the first user presses "accept" of the share confirmation information 30 illustrated in FIG. 7 and the publishing confirmation information 32 illustrated in FIG. 8, in step S108, the first terminal 14A transmits, to the server 12, agreement information indicating an agreement on the share ratio of the copyright and publication permission information indicating publication permission of the combined content.

When the second user presses "accept" of the share confirmation information 30 illustrated in FIG. 7 and the publishing confirmation information 32 illustrated in FIG. 8, in step S110, the second terminal 14B transmits, to the server 12, agreement information indicating an agreement on the share ratio of the copyright and publication permission information indicating the publication permission of the combined content.

In step S112, the reception unit 20 of the server 12 receives the agreement information and the publication permission information.

In step S114, in response to the reception of the agreement information and the publication permission information in step S112, the control unit 24 of the server 12 generates a combined content ID indicating the ID of the combined content on the basis of the first content ID, the first user ID, the second content ID, the second user ID, and time information indicating the time when the combined content is generated.

For example, the control unit 24 generates a hash value by inputting the first content ID, the first user ID, the second content ID, the second user ID, and the time information indicating the time when the combined content is generated to a known hash function, and sets the hash value as the combined content ID. The first content ID, the first user ID, the second content ID, and the second user ID may be similarly generated by a hash function. Thus, the combined content ID paired with the combined content is generated. In the embodiment, a case in which the combined content ID is generated by a hash function will be described as an example, but the invention is not limited thereto. The combined content ID may be generated by any method.

The combined content ID corresponds to a transaction ID in a virtual currency transaction using the blockchain, and for example, an electronic signature and a public key of each user can be used as the first user ID and the second user ID.

Figure 9:
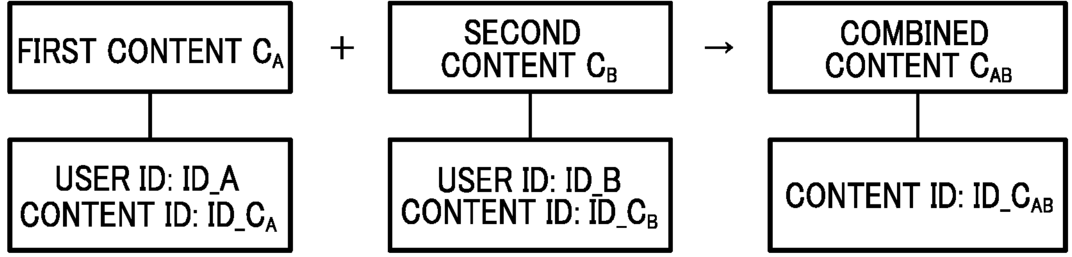
FIG. 9 is a diagram for describing generation of combined content and generation of a combined content ID.

FIG. 9 illustrates a diagram for describing the combined content ID. As illustrated in FIG. 9, a first content $C_A$ created by the first user A and a second content $C_B$ created by the second user B are combined to generate combined content $C_{AB}$. At this time, ID_$C_{AB}$ that is the combined content ID is generated on the basis of ID_A that is the first user ID, ID_$C_A$ that is the first content ID, ID_B that is the second user ID, ID_$C_B$ that is the second content ID, and time information when the combined content $C_{AB}$ is generated.

The combined content ID_$C_{AB}$ is generated by a hash function from ID_A that is the first user ID, ID_$C_A$ that is the first content ID, ID_B that is the second user ID, ID_$C_B$ that is the second content ID, and time information, and is uniquely generated from each data. Therefore, by registering the combined content ID_$C_{AB}$ in the blockchain, the combined content ID_$C_{AB}$ can also be used as, for example, a non-fungible token (NFT).

Next, in step S114, the control unit 24 of the server 12 stores the generated combined content ID_$C_{AB}$, the combined content $C_{AB}$, the use history information indicating a use history of the combined content $C_{AB}$, copyright share ratio information, the first content $C_A$, ID_$C_A$ that is the first content ID, ID_A that is the first user ID, the second content $C_B$, ID_$C_B$ that is the second content ID, and ID_B that is the second user ID in the data storage unit 22 in association with each other.

FIG. 4 is an example of a table stored in the data storage unit, and the combined content ID_$C_{AB}$, the combined content $C_{AB}$, the use history information indicating the use history of combined content $C_{AB}$, the copyright share ratio information, the first content $C_A$, ID_$C_A$ that is the first content ID, ID_A that is the first user ID, the second content $C_B$, ID_$C_B$ that is the second content ID, and ID_B that is the second user ID are stored in association with each other.

In step S116, the control unit 24 of the server 12 controls the transmission unit 26 to transmit the combined content ID generated in step S114 to the blockchain node 16.

In step S118, at least one blockchain node 16 registers the combined content ID transmitted from the server 12 in step S116 in the blockchain. The combined content ID is registered in the blockchain existing in the storage unit of each of the plurality of blockchain nodes 16. Thus, it becomes difficult to falsify the combined content ID, and the combined content ID can also be used as a non-fungible token (NFT).

When the sequence illustrated in FIG. 6 is executed, the combined content is generated, the share ratios of the copyrights of the plurality of users who are authors are also determined, and the publication permission of the combined content is also obtained, so that it is possible to manage the copyright usage fee for use of the combined content.

Figure 10:
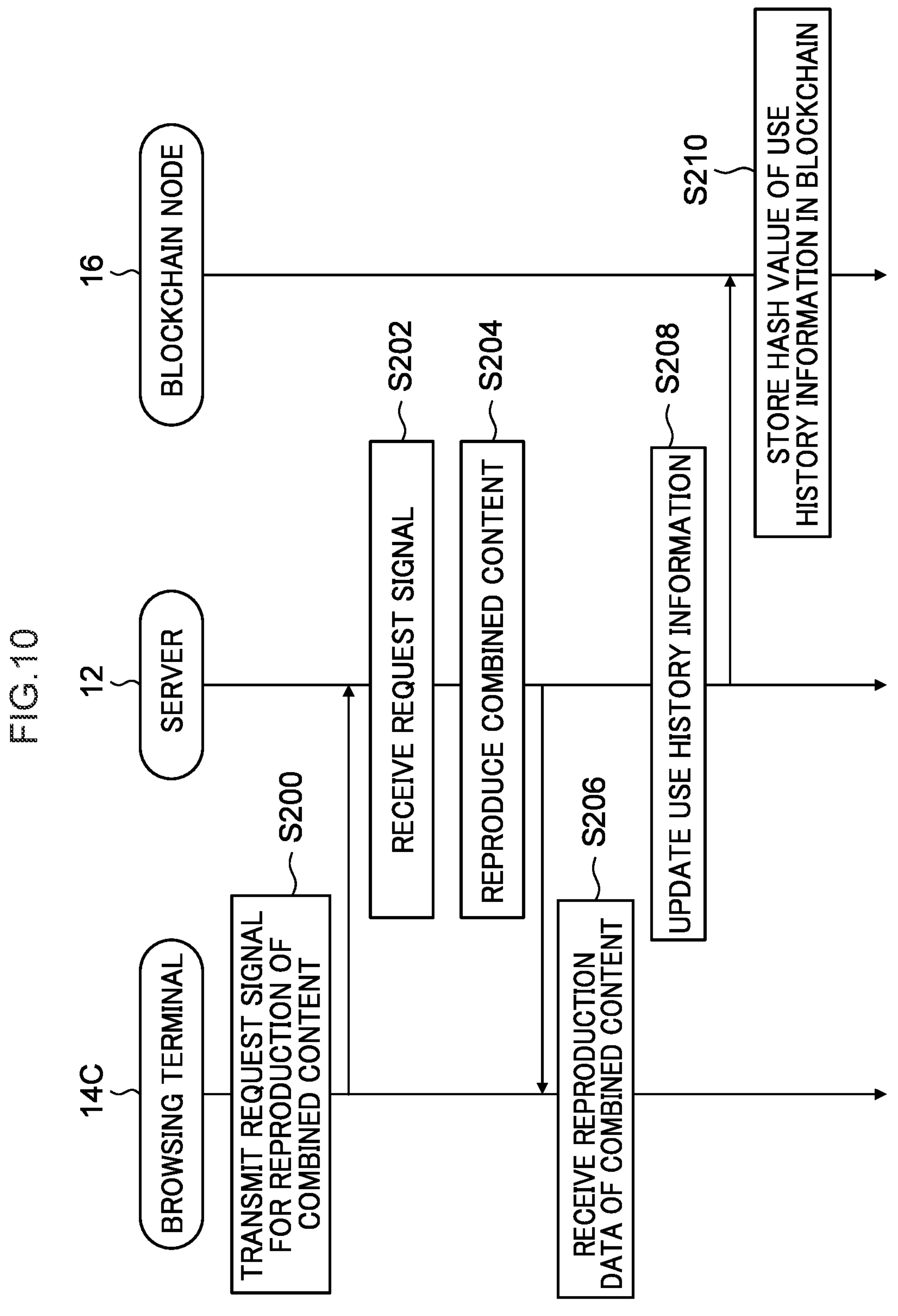
FIG. 10 is an explanatory diagram for describing processing executed by the information processing system of the embodiment.

After the sequence illustrated in FIG. 6 is executed, the sequence illustrated in FIG. 10 is executed by the information processing system 10. Hereinafter, for example, a case in which the user who operates the browsing terminal 14C browses the combined content by accessing the server 12 will be described.

In step S200, the user who operates the browsing terminal 14C operates the browsing terminal 14C to transmit a request signal indicating a request for reproducing the combined content to the server 12.

In step S202, the reception unit 20 of the server 12 receives the request signal transmitted from the browsing terminal 14C in step S200.

In step S204, the control unit 24 of the server 12 reproduces the combined content.

In step S206, the browsing terminal 14C receives reproduction data of the combined content.

The processing in steps S204 and S206 is what is called streaming reproduction of combined content.

In step S208, the control unit 24 of the server 12 updates the use history information of the table stored in the data storage unit 22 according to processing results of steps S204 and S206. Thus, the usage fee of the copyright according to the use history information is calculated, and the usage fee of the copyright to be paid to the first user and the second user is further calculated according to the share ratio of the copyright.

In step S208, the control unit 24 of the server 12 transmits a hash value of the updated use history information to the blockchain node 16.

In step S210, at least one blockchain node 16 registers the hash value of the use history information transmitted from the server 12 in step S208 in the blockchain. Thus, it is also difficult to falsify the use history information of the combined content.

After the combined content is published, one of the first user and the second user may want to stop publishing the combined content. In this case, the control unit 24 of the server 12 stops the publication of the combined content upon receiving an instruction signal to stop the publication transmitted from any one of the first terminal 14A and the second terminal 14B.

Alternatively, for example, although one of the first user and the second user desires to stop the publishing of the combined content, if the content created by the user himself/herself is excluded from the combined content, the publishing of the combined content may be considered to be continued. In this case, the control unit 24 of the server 12 temporarily stops the publication of the combined content upon receiving an instruction signal to delete its own content transmitted from any one of the first terminal 14A and the second terminal 14B. Then, the control unit 24 of the server 12 generates a new content by removing the content of the user who desires to stop publishing from the combined content. Alternatively, the control unit 24 of the server 12 generates a new content by removing the content of the user who desires to stop publishing from the combined content, and then combining an equivalent content of another user. For example, when the content of music in the combined content is removed from the combined content, another piece of music is added to generate the combined content. Then, the control unit 24 of the server 12 publishes the generated new content. Thus, it is possible to satisfy the desire of the user who has come to think that he/she does not want to disclose his/her own content later.

As described above, the information processing system according to the embodiment is an information processing system including a first terminal operated by a first user, a second terminal operated by a second user, and a server. The first terminal of the information processing system transmits the first content created by the first user, the first content ID indicating the ID of the first content, and the first user ID indicating the ID of the first user to the server. The second terminal of the information processing system transmits the second content created by the second user, the second content ID indicating the ID of the second content, and the second user ID indicating the ID of the second user to the server. The server generates the combined content by combining the first content and the second content, and generates the combined content ID indicating the ID of the combined content on the basis of the first content ID, the first user ID, the second content ID, the second user ID, and the time information indicating the time when the third content is generated. Then, the server stores the use history information indicating the use history of the combined content and the combined content ID in the data storage unit in association with each other, and updates the use history information according to the use history of the combined content. Thus, it is possible to manage the copyright of the content created by a plurality of users.

With the information processing system according to the embodiment, it is possible to automatically manage the copyright of the content, and thus it is possible to provide a system for an artist and a creator to freely act without requiring mediation by a company that performs a profit activity. It is possible to make it difficult to falsify the combined content ID by registering the combined content ID in the blockchain as an NFT.

The invention is not limited to the above-described embodiment, and various modifications and applications can be made without departing from the gist of the invention.

For example, in the embodiment, the case in which the combined content ID is registered in the blockchain of the blockchain node 16 has been described as an example, but the invention is not limited thereto. For example, only storing the combined content ID in the storage unit of the server 12 or another external device may be performed.

In the embodiment, although the case in which the use form of the combined content is reproduction of the combined content has been described as an example, the invention is not limited thereto, and other use forms may be used.

For example, various processes executed by the CPU reading software (program) in the embodiment may be executed by various processors other than the CPU. Examples of the processor in this case include a programmable logic device (PLD) in which a circuit configuration can be changed after manufacturing a field-programmable gate array (FPGA) or the like, a dedicated electric circuit that is a processor having a circuit configuration exclusively designed for executing specific processing such as an application specific integrated circuit (ASIC), and the like. Various processes may be executed by one of these various processors, or may be executed by a combination of two or more processors of the same type or different types (for example, a plurality of FPGAs, a combination of a CPU and an FPGA, and the like). The hardware structure of these various processors is an electric circuit in which circuit elements such as semiconductor elements are combined.

In the embodiment, the aspect in which the program is stored (installed) in advance in the storage has been described, but the invention is not limited thereto. The program may be provided in a form stored in a non-transitory storage medium such as a compact disk read only memory (CD-ROM), a digital versatile disk read only memory (DVD-ROM), and a universal serial bus (USB) memory. The program may be downloaded from an external device via a network.

The processing performed by each device in the embodiment has been described as software processing performed by executing a program, but may be processing performed by hardware. Alternatively, both software and hardware may be combined. The program stored in the ROM may be stored in various storage media and distributed.

In the embodiment, the case in which the server 12, which is an example of the information processing device, generates the combined content by combining the first content and the second content and generates the combined content ID has been described as an example, but the invention is not limited thereto. A part or all of the processing executed by the server 12 of the embodiment may be executed by a terminal such as a smartphone carried by the user.

In the embodiment, the case in which the combined content ID is generated on the basis of the first content ID, the first user ID, the second content ID, the second user ID, and the time information indicating the time when the third content is generated has been described as an example, but the invention is not limited thereto. For example, any method may be used as long as the combined content ID is generated on the basis of the first identification information indicating identification information of the first content and the second identification information indicating identification information of the second content. For example, the combined content ID may be generated on the basis of the first content ID and the second content ID. Alternatively, for example, the combined content ID may be generated on the basis of the first user ID and the second user ID.

The invention claimed is:

1. An information processing system comprising a first terminal operated by a first user, a second terminal operated by a second user, and an information processing device, wherein the first terminal transmits a first content created by the first user and first identification information indicating identification information of the first content to the information processing device, the second terminal transmits a second content created by the second user and second identification information indicating identification information of the second content to the information processing device, and when generating a third content by combining the first content and the second content, the information processing device inputs, on a basis of the first identification information, the second identification information, and a function prepared in advance, the first identification information and the second identification information to the function, generates third identification information that is identification information that is a hash value output from the function and that is identification information indicating non-substitutability of the third content, stores use history information indicating a use history of the third content and the third identification information in a storage unit including a distributed ledger technology in association with each other, updates the use history information depending on the use history of the third content, and enables management of copyright of the third content while ensuring uniqueness of the third content by non-substitutability of the third identification information.

2. The information processing system according to claim 1, wherein a hash value of the use history information is stored in the storage unit including a distributed ledger technology.

3. The information processing system according to claim 1, wherein the information processing device generates a third content ID as the third identification information on a basis of a first content ID as the first identification information and a second content ID as the second identification information.

4. The information processing system according to claim 1, wherein the information processing device generates a third content ID as the third identification information on a basis of a first user ID indicating an ID of the first user as the first identification information and a second user ID indicating an ID of the second user as the second identification information.

5. The information processing system according to claim 1, wherein, in a case in which an instruction signal to delete the first content from the third content is received, the information processing device deletes the first content from the third content, and in a case in which an instruction signal to delete the second content from the third content is received, the information processing device deletes the second content from the third content.

6. The information processing system according to claim 1, wherein the information processing device generates a new content by adding a content different from the first content and the second content to the third content from which the first content or the second content has been deleted.

7. An information processing device in an information processing system comprising a first terminal operated by a first user, a second terminal operated by a second user, and the information processing device, wherein the first terminal transmits a first content created by the first user and first identification information indicating identification information of the first content to the information processing device, the second terminal transmits a second content created by the second user and second identification information indicating identification information of the second content to the information processing device, and when generating a third content by combining the first content and the second content, the information processing device inputs, on a basis of the first identification information, the second identification information, and a function prepared in advance, the first identification information and the second identification information to the function, generates third identification information that is identification information that is a hash value output from the function and that is identification information indicating non-substitutability of the third content, stores use history information indicating a use history of the third content and the third identification information in a storage unit including a distributed ledger technology in association with each other, updates the use history information depending on the use history of the third content, and enables management of copyright of the third content while ensuring uniqueness of the third content by non-substitutability of the third identification information.

8. An information processing method executed by an information processing device in an information processing system comprising a first terminal operated by a first user, a second terminal operated by a second user, and the information processing device, the method comprising:

by a computer included in the information processing device, executing processing in which:

the first terminal transmits a first content created by the first user and first identification information indicating identification information of the first content to the information processing device;

the second terminal transmits a second content created by the second user and second identification information indicating identification information of the second content to the information processing device; and when generating a third content by combining the first content and the second content, the information processing device inputs, on a basis of the first identification information, the second identification information, and a function prepared in advance, the first identification information and the second identification information to the function, generates third identification information that is identification information that is a hash value output from the function and that is identification information indicating non-substitutability of the third content, stores use history information indicating a use history of the third content and the third identification information in a storage unit including a distributed ledger technology in association with each other, updates the use history information depending on the use history of the third content, and enables management of copyright of the third content while ensuring uniqueness of the third content by non-substitutability of the third identification information.

9. An information processing program to be executed by a computer included in an information processing device in an information processing system comprising a first terminal operated by a first user, a second terminal operated by a second user, and the information processing device, the program causing the computer included in the information processing device to execute processing in which:

the first terminal transmits a first content created by the first user and first identification information indicating identification information of the first content to the information processing device;

the second terminal transmits a second content created by the second user and second identification information indicating identification information of the second content to the information processing device; and when generating a third content by combining the first content and the second content, the information processing device inputs, on a basis of the first identification information, the second identification information, and a function prepared in advance, the first identification information and the second identification information to the function, generates third identification information that is identification information that is a hash value output from the function and that is identification information indicating non-substitutability of the third content, stores use history information indicating a use history of the third content and the third identification information in a storage unit including a distributed ledger technology in association with each other, updates the use history information depending on the use history of the third content, and enables management of copyright of the third content while ensuring uniqueness of the third content by non-substitutability of the third identification information.

* * * * *